US009369461B1

(12) United States Patent
Roth et al.

(10) Patent No.: US 9,369,461 B1
(45) Date of Patent: Jun. 14, 2016

(54) PASSCODE VERIFICATION USING HARDWARE SECRETS

(71) Applicant: Amazon Technologies, Inc., Reno, NV (US)

(72) Inventors: Gregory Branchek Roth, Seattle, WA (US); Gregory Alan Rubin, Seattle, WA (US); Nachiketh Rao Potlapally, Arlington, VA (US)

(73) Assignee: Amazon Technologies, Inc., Seattle, WA (US)

( * ) Notice: Subject to any disclaimer, the term of this patent is extended or adjusted under 35 U.S.C. 154(b) by 45 days.

(21) Appl. No.: 14/149,698

(22) Filed: Jan. 7, 2014

(51) Int. Cl.
*H04L 9/32* (2006.01)
*H04L 29/06* (2006.01)

(52) U.S. Cl.
CPC .................... *H04L 63/083* (2013.01)

(58) Field of Classification Search
CPC ....... G06F 21/31; H04L 63/08; H04L 63/083; H04L 9/32; H04L 63/0861
USPC .......................................................... 726/7
See application file for complete search history.

(56) References Cited

U.S. PATENT DOCUMENTS

| 5,179,591 | A | 1/1993 | Hardy et al. |
| 5,200,999 | A | 4/1993 | Matyas et al. |
| 5,497,421 | A | 3/1996 | Kaufman et al. |
| 6,084,969 | A | 7/2000 | Wright et al. |
| 6,097,817 | A | 8/2000 | Bilgic et al. |
| 6,185,316 | B1 | 2/2001 | Buffam |
| 6,453,416 | B1 | 9/2002 | Epstein |
| 6,826,686 | B1 | 11/2004 | Peyravian et al. |
| 6,851,054 | B2 | 2/2005 | Wheeler et al. |
| 6,957,393 | B2 | 10/2005 | Fano et al. |
| 6,959,394 | B1 | 10/2005 | Brickell et al. |
| 6,985,583 | B1 | 1/2006 | Brainard et al. |
| 7,010,689 | B1 | 3/2006 | Matyas et al. |
| 7,073,195 | B2 | 7/2006 | Brickell et al. |
| 7,139,917 | B2 | 11/2006 | Jablon |
| 7,228,417 | B2 | 6/2007 | Roskind |
| 7,320,076 | B2 | 1/2008 | Caronni |
| 7,512,965 | B1 | 3/2009 | Amdur et al. |
| 7,685,430 | B1 | 3/2010 | Masurkar |
| 7,721,322 | B2 | 5/2010 | Sastry et al. |

(Continued)

FOREIGN PATENT DOCUMENTS

| WO | WO2006077822 | 7/2006 |
| WO | WO2008024705 | 2/2008 |
| WO | WO2014063361 | 5/2014 |

OTHER PUBLICATIONS

Amazon, "Amazon Prime Video—security considerations," Amazon.com General Help Forum, http://www.amazon.com/gp/help/customer/forums?ie=UTF8&cdForum=Fx2NFGOONPZEXIP&cdPage=1&cdSort=newest&cdThread=Tx18VZVGGU0Y32, latest reply Jun. 17, 2013, 3 pages.

(Continued)

*Primary Examiner* — Baotran N To
(74) *Attorney, Agent, or Firm* — Davis Wright Tremaine LLP

(57) ABSTRACT

A hardware secret is securely maintained in a computing device. The hardware secret is used to generate a hash of a passcode that is persistently stored for later use in verification. When a passcode is received as part of an authentication attempt, the hardware secret is used to generate a reference hash of the received passcode that is then compared with the persistently stored hash to determine whether there is a match.

23 Claims, 8 Drawing Sheets

(56) References Cited

U.S. PATENT DOCUMENTS

| | | |
|---|---|---|
| 7,757,271 B2 | 7/2010 | Amdur et al. |
| 7,765,584 B2 | 7/2010 | Roskind |
| 7,836,306 B2 | 11/2010 | Pyle et al. |
| 7,890,767 B2 | 2/2011 | Smith et al. |
| 7,913,084 B2 | 3/2011 | Medvinsky et al. |
| 7,917,764 B2 | 3/2011 | Futa |
| 8,006,289 B2 | 8/2011 | Hinton et al. |
| 8,024,562 B2 | 9/2011 | Gentry et al. |
| 8,041,954 B2 | 10/2011 | Plesman |
| 8,059,820 B2 | 11/2011 | Malaviarachchi et al. |
| 8,151,116 B2 | 4/2012 | van der Horst et al. |
| 8,275,356 B2 | 9/2012 | Hickie |
| 8,321,558 B1 | 11/2012 | Sirota et al. |
| 8,332,922 B2 | 12/2012 | Dickinson et al. |
| 8,370,638 B2 | 2/2013 | Duane et al. |
| 8,386,800 B2 | 2/2013 | Kocher et al. |
| 8,387,117 B2 | 2/2013 | Eom et al. |
| 8,418,222 B2 | 4/2013 | Gbadegesin et al. |
| 8,423,759 B2 | 4/2013 | Moreau |
| 8,453,198 B2 | 5/2013 | Band et al. |
| 8,464,058 B1 | 6/2013 | Chen et al. |
| 8,464,354 B2 | 6/2013 | Teow et al. |
| 8,490,162 B1 * | 7/2013 | Popoveniuc et al. ............. 726/5 |
| 8,533,772 B2 | 9/2013 | Garg et al. |
| 8,543,916 B2 | 9/2013 | Anderson et al. |
| 8,561,152 B2 | 10/2013 | Novak et al. |
| 8,621,561 B2 | 12/2013 | Cross et al. |
| 8,688,813 B2 | 4/2014 | Maes |
| 8,695,075 B2 | 4/2014 | Anderson et al. |
| 8,739,308 B1 | 5/2014 | Roth |
| 8,745,205 B2 | 6/2014 | Anderson et al. |
| 8,776,190 B1 | 7/2014 | Cavage et al. |
| 8,776,204 B2 | 7/2014 | Faynberg et al. |
| 8,868,923 B1 * | 10/2014 | Hamlet et al. ................ 713/186 |
| 8,892,865 B1 | 11/2014 | Roth |
| 2001/0008013 A1 | 7/2001 | Johnson et al. |
| 2001/0018739 A1 | 8/2001 | Anderson et al. |
| 2002/0016840 A1 | 2/2002 | Herzog et al. |
| 2002/0067832 A1 | 6/2002 | Jablon |
| 2002/0112181 A1 | 8/2002 | Smith |
| 2002/0161723 A1 | 10/2002 | Asokan et al. |
| 2002/0161998 A1 | 10/2002 | Cromer et al. |
| 2002/0162019 A1 | 10/2002 | Berry et al. |
| 2002/0194483 A1 | 12/2002 | Wenocur et al. |
| 2002/0198848 A1 | 12/2002 | Michener |
| 2003/0016826 A1 | 1/2003 | Asano et al. |
| 2003/0041110 A1 | 2/2003 | Wenocur et al. |
| 2003/0135740 A1 | 7/2003 | Talmor et al. |
| 2003/0145197 A1 | 7/2003 | Lee et al. |
| 2003/0149781 A1 | 8/2003 | Yared et al. |
| 2003/0188117 A1 | 10/2003 | Yoshino et al. |
| 2004/0088260 A1 | 5/2004 | Foster et al. |
| 2004/0103096 A1 | 5/2004 | Larsen |
| 2004/0104265 A1 | 6/2004 | Okada et al. |
| 2004/0128505 A1 | 7/2004 | Larsen |
| 2004/0128510 A1 | 7/2004 | Larsen |
| 2004/0131185 A1 | 7/2004 | Kakumer |
| 2004/0143733 A1 | 7/2004 | Ophir et al. |
| 2004/0158734 A1 | 8/2004 | Larsen |
| 2004/0172535 A1 | 9/2004 | Jakobsson et al. |
| 2005/0036611 A1 | 2/2005 | Seaton et al. |
| 2005/0043999 A1 | 2/2005 | Ji et al. |
| 2005/0060580 A1 | 3/2005 | Chebolu et al. |
| 2005/0080914 A1 | 4/2005 | Lerner et al. |
| 2005/0132192 A1 | 6/2005 | Jeffries et al. |
| 2005/0132215 A1 | 6/2005 | Wang et al. |
| 2005/0166263 A1 | 7/2005 | Nanopoulos et al. |
| 2005/0235148 A1 | 10/2005 | Scheidt et al. |
| 2005/0273862 A1 | 12/2005 | Benaloh et al. |
| 2005/0278547 A1 | 12/2005 | Hyndman et al. |
| 2006/0041759 A1 | 2/2006 | Kaliski et al. |
| 2006/0070116 A1 | 3/2006 | Park |
| 2006/0075462 A1 | 4/2006 | Golan et al. |
| 2006/0094406 A1 | 5/2006 | Cortegiano |
| 2006/0094410 A1 | 5/2006 | Cortegiano |
| 2006/0100928 A1 | 5/2006 | Walczak, Jr. et al. |
| 2006/0130100 A1 | 6/2006 | Pentland |
| 2006/0149677 A1 | 7/2006 | Shahine et al. |
| 2006/0174125 A1 | 8/2006 | Brookner |
| 2006/0190331 A1 | 8/2006 | Tollinger et al. |
| 2006/0206440 A1 | 9/2006 | Anderson et al. |
| 2006/0206925 A1 | 9/2006 | Dillaway et al. |
| 2006/0218625 A1 | 9/2006 | Pearson et al. |
| 2006/0230284 A1 | 10/2006 | Fiske |
| 2006/0256961 A1 | 11/2006 | Brainard et al. |
| 2006/0271785 A1 | 11/2006 | Holtmanns et al. |
| 2006/0282878 A1 | 12/2006 | Stanley et al. |
| 2007/0005955 A1 | 1/2007 | Pyle et al. |
| 2007/0033396 A1 | 2/2007 | Zhang et al. |
| 2007/0037552 A1 | 2/2007 | Lee et al. |
| 2007/0061571 A1 | 3/2007 | Hammes et al. |
| 2007/0061885 A1 | 3/2007 | Hammes et al. |
| 2007/0136361 A1 | 6/2007 | Lee et al. |
| 2007/0157309 A1 | 7/2007 | Bin et al. |
| 2007/0174614 A1 | 7/2007 | Duane et al. |
| 2007/0186102 A1 | 8/2007 | Ng |
| 2007/0234410 A1 | 10/2007 | Geller |
| 2007/0250706 A1 | 10/2007 | Oba |
| 2007/0277231 A1 | 11/2007 | Medvinsky et al. |
| 2008/0010665 A1 | 1/2008 | Hinton et al. |
| 2008/0034406 A1 | 2/2008 | Ginter et al. |
| 2008/0040773 A1 | 2/2008 | AlBadarin et al. |
| 2008/0066150 A1 | 3/2008 | Lim |
| 2008/0080718 A1 | 4/2008 | Meijer et al. |
| 2008/0083036 A1 | 4/2008 | Ozzie et al. |
| 2008/0163337 A1 | 7/2008 | Tuliani et al. |
| 2008/0168530 A1 | 7/2008 | Kuehr-McLaren et al. |
| 2008/0182592 A1 | 7/2008 | Cha et al. |
| 2008/0204195 A1 | 8/2008 | Diorio et al. |
| 2008/0222694 A1 | 9/2008 | Nakae |
| 2008/0301444 A1 | 12/2008 | Kim et al. |
| 2008/0301630 A1 | 12/2008 | Arnold et al. |
| 2008/0313719 A1 | 12/2008 | Kaliski, Jr. et al. |
| 2009/0006862 A1 | 1/2009 | Alkove et al. |
| 2009/0013402 A1 | 1/2009 | Plesman |
| 2009/0019134 A1 | 1/2009 | Bellifemine et al. |
| 2009/0049518 A1 | 2/2009 | Roman et al. |
| 2009/0172793 A1 | 7/2009 | Newstadt et al. |
| 2009/0210712 A1 | 8/2009 | Fort |
| 2009/0217385 A1 | 8/2009 | Teow et al. |
| 2009/0254572 A1 | 10/2009 | Redlich et al. |
| 2009/0320093 A1 | 12/2009 | Glazier et al. |
| 2010/0017603 A1 | 1/2010 | Jones |
| 2010/0037304 A1 | 2/2010 | Canning et al. |
| 2010/0058060 A1 | 3/2010 | Schneider |
| 2010/0058072 A1 | 3/2010 | Teow et al. |
| 2010/0071056 A1 | 3/2010 | Cheng |
| 2010/0083001 A1 | 4/2010 | Shah et al. |
| 2010/0111296 A1 | 5/2010 | Brown et al. |
| 2010/0125894 A1 | 5/2010 | Yasrebi et al. |
| 2010/0131756 A1 | 5/2010 | Schneider |
| 2010/0142704 A1 | 6/2010 | Camenisch et al. |
| 2010/0205649 A1 | 8/2010 | Becker et al. |
| 2010/0239095 A1 | 9/2010 | Carter et al. |
| 2010/0251347 A1 | 9/2010 | Roskind |
| 2010/0269156 A1 | 10/2010 | Hohlfeld et al. |
| 2010/0290476 A1 | 11/2010 | Brindle et al. |
| 2010/0332845 A1 | 12/2010 | Asaka |
| 2011/0004753 A1 | 1/2011 | Gomi et al. |
| 2011/0010538 A1 | 1/2011 | Falk et al. |
| 2011/0035593 A1 | 2/2011 | Pyle et al. |
| 2011/0055562 A1 | 3/2011 | Adelman et al. |
| 2011/0055585 A1 | 3/2011 | Lee |
| 2011/0078107 A1 | 3/2011 | Almeida et al. |
| 2011/0083015 A1 | 4/2011 | Meier |
| 2011/0099362 A1 | 4/2011 | Haga et al. |
| 2011/0131415 A1 | 6/2011 | Schneider |
| 2011/0138192 A1 | 6/2011 | Kocher et al. |
| 2011/0167479 A1 | 7/2011 | Maes |
| 2011/0179469 A1 | 7/2011 | Blinn et al. |
| 2011/0231940 A1 | 9/2011 | Perumal et al. |
| 2011/0239283 A1 | 9/2011 | Chern |
| 2011/0252229 A1 | 10/2011 | Belenkiy et al. |
| 2011/0265172 A1 | 10/2011 | Sharma et al. |

(56) References Cited

U.S. PATENT DOCUMENTS

| | | |
|---|---|---|
| 2011/0296497 A1 | 12/2011 | Becker |
| 2011/0311055 A1 | 12/2011 | Parann-Nissany |
| 2011/0320606 A1 | 12/2011 | Madduri et al. |
| 2012/0017095 A1 | 1/2012 | Blenkhorn et al. |
| 2012/0020474 A1 | 1/2012 | Kudoh et al. |
| 2012/0023334 A1 | 1/2012 | Brickell et al. |
| 2012/0036551 A1 | 2/2012 | Le Saint et al. |
| 2012/0054625 A1 | 3/2012 | Pugh et al. |
| 2012/0060035 A1 | 3/2012 | Kalmady et al. |
| 2012/0106735 A1 | 5/2012 | Fukuda |
| 2012/0110636 A1 | 5/2012 | Van Biljon et al. |
| 2012/0144034 A1 | 6/2012 | McCarty |
| 2012/0159577 A1 | 6/2012 | Belinkiy et al. |
| 2012/0233216 A1 | 9/2012 | Lim |
| 2012/0243687 A1 | 9/2012 | Li |
| 2012/0245978 A1 | 9/2012 | Jain |
| 2012/0265690 A1 | 10/2012 | Bishop et al. |
| 2012/0288089 A1 | 11/2012 | Sauerwald et al. |
| 2012/0317414 A1 | 12/2012 | Glover |
| 2013/0031255 A1 | 1/2013 | Maloy et al. |
| 2013/0086662 A1 | 4/2013 | Roth |
| 2013/0086663 A1 | 4/2013 | Roth et al. |
| 2013/0111217 A1 | 5/2013 | Kopasz et al. |
| 2013/0132232 A1 | 5/2013 | Pestoni et al. |
| 2013/0145447 A1* | 6/2013 | Maron ............... 726/6 |
| 2013/0166918 A1 | 6/2013 | Shahbazi et al. |
| 2013/0191884 A1 | 7/2013 | Leicher et al. |
| 2013/0198519 A1 | 8/2013 | Marien |
| 2013/0254536 A1 | 9/2013 | Glover |
| 2013/0282461 A1 | 10/2013 | Ovick et al. |
| 2013/0318630 A1 | 11/2013 | Lam |
| 2014/0013409 A1 | 1/2014 | Halageri |
| 2014/0082715 A1 | 3/2014 | Grajek et al. |
| 2014/0122866 A1 | 5/2014 | Haeger et al. |
| 2014/0181925 A1 | 6/2014 | Smith |
| 2014/0208408 A1 | 7/2014 | Bilgen et al. |
| 2014/0281477 A1 | 9/2014 | Nayshtut et al. |
| 2014/0281487 A1 | 9/2014 | Klausen et al. |
| 2015/0082039 A1 | 3/2015 | Stalzer et al. |
| 2015/0089614 A1 | 3/2015 | Mathew et al. |
| 2015/0149631 A1 | 5/2015 | Lissack |

OTHER PUBLICATIONS

Berners-Lee et al., "Uniform Resource Identifier (URI): Generic Syntax," Network Working Group Request for Comments: 3986, The Internet Society 2005 retrieved on Nov. 30, 2011, from http://www.ietf.org/rtc/rfc3986.txt.

Ghorbei-Talbi et al., "Managing Delegation in Access Control Models," International Conference on Advanced Computing and Communications, pp. 744-751, Dec. 18-21, 2007.

International Search Report and Written Opinion mailed Dec. 30, 2014 in International Patent Application No. PCT/US2014/057043, filed Sep. 23, 2014.

International Search Report and Written Opinion mailed Dec. 30, 2014 in International Patent Application No. PCT/US2014/057051, filed Sep. 23, 2014.

International Search Report and Written Opinion mailed Oct. 22, 2014, International Patent Application No. PCT/US2014/042569, filed Jun. 16, 2014.

Krawczyk et al., "HMAC: Keyed-Hashing for Message Authentication," Internet Engineering Task Force (IETF) Request for Comments: 2104, Feb. 1997, retrieved Jan. 22, 2015, from https://tols.ietf.org/html/rfc2104, pp. 1-11.

Liscano et al., "A Context-based Delegation Access Control Model for Pervasive Computing," 21st International Conference on Advanced Information Networking and Applications Workshops 2:44-51, May 21-23, 2007.

Massachusetts Institute of Technology, "Kerberos V5 System Administrator's Guide [online]," May 2012 [retrieved on Jun. 27, 2012], Retrieved from the Internet: http://web.mit.edu/kerberos/krb5-1.10/krb5-1.10.2/doc/krb5-admin.html, 57 pages.

Massachusetts Institute of Technology, "Kerberos V5 Installation Guide [online]," May 2012 [retrieved on Jun. 27, 2012], retrieved from the Internet: http://web.mit.edu/kerberos/krb5-1.10/krb5-1.10.2/doc/krb5-install.htm, 65 pages.

Massachusetts Institute of Technology, "Kerberos V5 UNIX User's Guide," dated May 2012, retrieved on Jun. 28, 2012, from <http://web.mit.edu/kerberos/krb5-1.10/krb5-1.10.2/doc/krb5-user.html>, 38 pages.

Patent Cooperation Treaty, "Notification of Transmittal of the International Search Report and the Written Opinion of the International Searching Authority, or the Declaration," issued to International Application No. PCT/US/058083 on Dec. 27, 2012.

Roth et al., "Hierarchical Data Access Techniques," U.S. Appl. No. 13/431,882, filed Mar. 27, 2012.

Simpson, "PPP Challenge Handshake Authentication Protocol (CHAP)," Network Working Group, Aug. 1996, retrieved from Internet Jun. 27, 2012, https://tools.ietf.org/html/rfc1994, 13 pages.

U.S. Appl. No. 13/431,760, filed Mar. 27, 2012.

U.S. Appl. No. 13/431,898, filed Mar. 27, 2012.

Wang et al., "Extending the Security Assertion Markup Language to Support Delegation for Web Services and Grid Services," IEEE International Conference on Web Services 1:67-74, Jul. 11-15, 2005.

Wikipedia, "Physical unclonable function," retrieved Aug. 22, 2013, from http://en.wikipedia.org/wiki/Physical_unclonable_function, 8 pages.

TCG Published, "TPM Main Part 1 Design Principles," Specification Version 1.2, Revision 116, Mar. 1, 2011, 184 pages.

TCG Published, "TPM Main Part 2 TPM Structures," Specification Version 1.2, Level 2 Revision 116, Mar. 1, 2011, 202 pages.

TCG Published, "TPM Main Part 3 Commands," Specification Version 1.2, Level 2 Revision 116, Mar. 1, 2011, 339 pages.

* cited by examiner

PASSCODE VERIFICATION USING HARDWARE SECRETS

CROSS REFERENCE TO RELATED APPLICATIONS

This application incorporates by reference for all purposes the full disclosure of co-pending U.S. patent application Ser. No. 14/149,710, filed concurrently herewith, entitled "HARDWARE SECRET USAGE LIMITS" and U.S. patent application Ser. No. 14/149,721, filed concurrently herewith, entitled "DISTRIBUTED PASSCODE VERIFICATION SYSTEM".

BACKGROUND

The security of resources is of importance in many contexts. Unauthorized access to various types of data, for example, can have numerous adverse consequences, such as unrealized revenue, data loss, a loss of customer goodwill, damage to reputation, and/or even civil or criminal penalties. Likewise, unauthorized access to property, whether physical property or intellectual property, can result in similar adverse consequences, including the loss of the property itself. As a result, many systems have developed over the years for controlling access to resources. An automated teller machine, for example, often requires simultaneous possession of a bank card and a personal identification number (PIN). Various websites and other services provided over the Internet and other networks often require users to enter passwords before certain types of access are granted. Even access to real property often requires proof of possession of some type of credential (e.g., PIN, password, and/or possession of an access card) before access is granted.

In many contexts, it is difficult to find a balance between security and usability. In the case of passwords, for example, users often select passwords to be easy to remember. Typically, this means that passwords contain some type of semantic meaning to their holders. Similarly, PINs often are of a small number of digits (e.g., 4) and also often picked to have some sort of semantic meaning. Therefore, the size of a password space and/or the number of passwords that users actually use is relatively small, making certain types of security attacks (e.g., automated password guessing) more likely to succeed.

BRIEF DESCRIPTION OF THE DRAWINGS

Various embodiments in accordance with the present disclosure will be described with reference to the drawings, in which.

DETAILED DESCRIPTION

Figure 1:
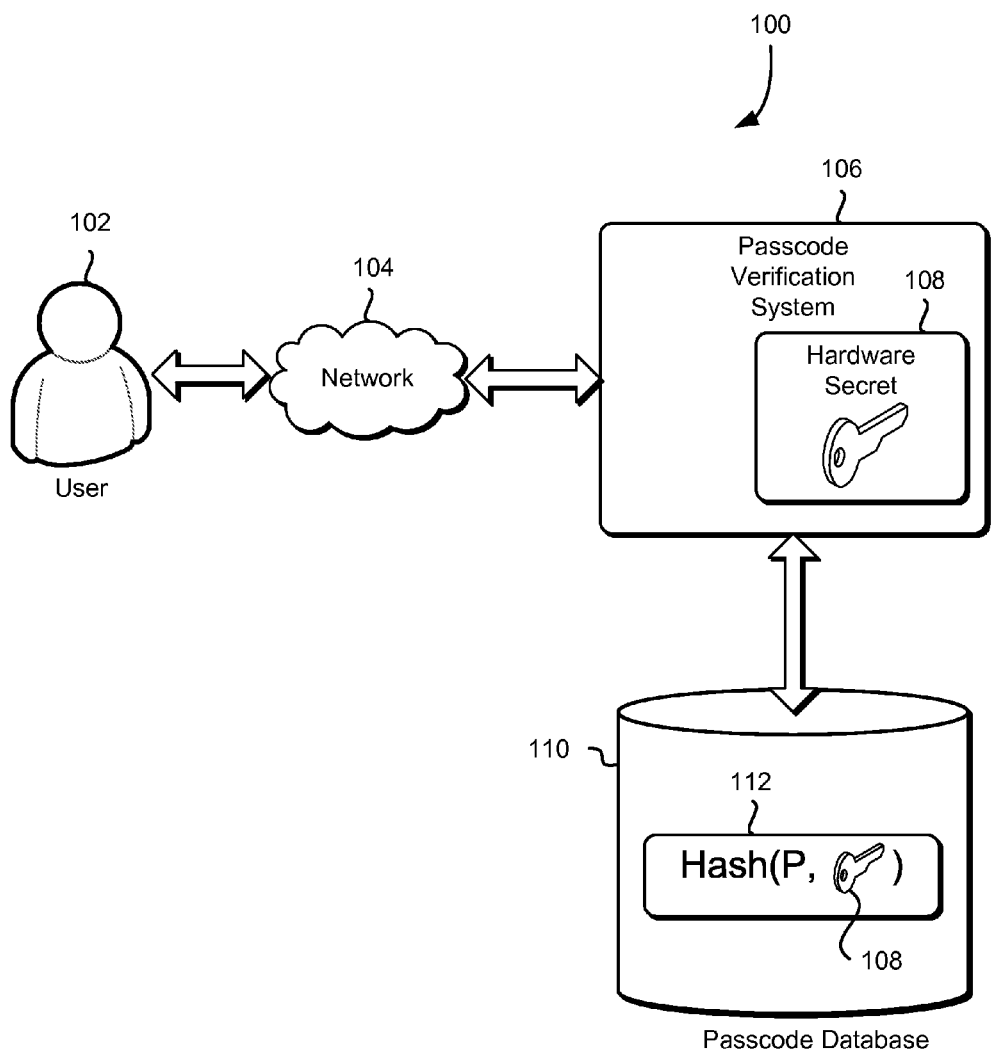
FIG. 1 shows an illustrative example of an environment in which various embodiments can be implemented.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested herein relate to the use of securely maintained secret information in various authentication methods. The methods may be used as a mechanism to control access to various resources, such as data, physical items, real property, currency and others. In an embodiment, a passcode (e.g., password) hash value (which may be referred to simply as a "hash") is calculated using a hardware secret that, as discussed in more detail below, may be information to which access, outside of a module configured to perform calculations with the information, is extraordinarily difficult or even effectively impossible. The calculated hash may be used to populate an entry in a database of passcode hashes that associates hashes of passcodes with corresponding identities. When a passcode of an identity (e.g., user) is provided for verification, a reference hash (generally, "reference value") of the passcode may be calculated based at least in part on the passcode and the hardware secret. The calculated reference hash may be compared to a stored passcode hash in the database. If the calculated reference hash matches the stored passcode hash, the received passcode may be considered to be verified and a system relying on such verification may operate accordingly.

The hardware secret, as noted, may be secret information that is securely maintained and used for calculating password hashes. The hardware secret may be configured such that the hardware secret has a value from a set of values that has a specified size. For example, the size of the set may be configured such that the cardinality of the set is larger than the cardinality of a set of possible passcode values. Generally, the size of the set may be selected to prevent cryptographic attacks. As an example, the size of the set may be selected so that assumed amounts of processing resources (which may be based at least in part on estimates of current or future capabilities) collectively working to determine a passcode from a given hash of a passcode would, probabilistically speaking, be extremely unlikely to determine the passcode in a specified reasonable amount of time, where the probability may be a specified value set at some acceptable threshold. As an illustrative example, the size of the set may be such that all processing capacity on Earth, if collectively working to determine a passcode from a hash value, would have a probability of less than a 0.0000000001 of determining the passcode in one hundred years. Of course, the particular example values given are for illustration, and generally any size set may be used. In some embodiments, for example, the set of possible hardware secrets is chosen to have at least $2^{256}$ members. In this manner, mere access to the information stored in a database of passcode hashes does not provide opportunity to determine passcodes from hashes, thereby enabling unauthorized presentation of a passcode for the purpose of illegitimately gaining access to a resource. On the contrary, such a cryptographic attack is infeasible, even if parallelization techniques are utilized.

Various embodiments of the present disclosure also provide for additional security of passcodes. For example, as implied above, in embodiments where the size of the set of possible hardware secrets is sufficiently large, cryptographic attacks are more likely to succeed by guessing the passcodes themselves since passcodes, relatively speaking, are from a much smaller space of possible values, especially when considering that users often select passcodes with semantic meaning and, generally, passcodes that are easy to remember. To prevent such attacks even when an attacker has gained access to and control over the device having the hardware secret, the device may be configured with particular performance characteristics that render such attacks infeasible. As one example, a hardware secret may be used to ensure that a work factor (e.g., amount of time or number of operations needed to determine guess a passcode) is statistically large. For example, the hash of a passcode may require iterative use of the hardware secret, possibly for thousands or millions of operations. In this manner, each guess at a password may require a number of operations (and a corresponding amount of time). The work factor may be configured such that the computational work required to calculate a password hash is insignificant for authorized uses of a system (e.g., a user providing a password to gain access to a resource), but significant for unauthorized uses (e.g., repeatedly guessing different passwords). For example, calculations that take several milliseconds may be insignificant to a human user, but may cause significant delay for cryptographic attacks requiring numerous password guesses.

As another example, a device using a hardware secret to calculate passcode hashes may be configured to perform only a limited number of operations. In some embodiments, the number is deterministically determined (e.g., set in programming logic). A device may, for instance, be configured to perform self-destructive actions after performing a programmed number of operations. The limit may be probabilistically determined in some embodiments. For example, certain computing resources (e.g., computer memory) wears out and fails after a number of operations (e.g., write operations) where the number may not be consistent across devices. Algorithms for calculating passcode hashes may be configured to cause a device to, statistically speaking, wear out after a certain number of operations. The number of operations, whether deterministically or probabilistically set, may be configured such that, the device is able to perform a specified sufficient number of operations (e.g., a number of passcode verifications the device is expected to legitimately perform during its lifetime or during a specified amount of time). Cryptographic attacks involving password guessing, however, may require many more password verification attempts than the device is expected to legitimately perform in a lifetime. Accordingly, the number of operations may also be set to cause a device to fail before a cryptographic attack involving password guessing has more than some specified probability of succeeding by guessing a correct passcode for a given hash.

Other mechanisms may also be used to prevent successful cryptographic attacks, even with control over a device having a hardware secret used to calculate password hashes. For example, processors may be deliberately configured and/or selected to be, relatively speaking, slow. Slow processing capability may be insignificant to a human user, but slower speeds correlate with attacks that proceed slower and, therefore, require more time on average before successfully determining a passcode from a hash. Other techniques and combinations of techniques may also be used.

Generally, other variations are considered as being within the scope of the present disclosure. For example, in some embodiments, hardware secrets are used in one-time passcode/password (OTP) schemes. A security token may be a device or programming module configured to deterministically generate passcodes based at least in part on a seed value (which may be referred to as a "seed") and a time, which may be a time of passage since some reference time (e.g., token creation or Unix time). At predefined times (or otherwise for multiple times during a duration of time), the token may generate a new passcode based at least in part on the seed and the time. A passcode provisioning system may be configured to likewise deterministically calculate the same codes (e.g., a finite number of codes that the token will produce), although in advance. The codes may be provided to an OTP verification system which may then use a hardware secret to calculate, for the calculated codes, passcode hashes. The passcode hashes may be stored in a database used to verify passcodes provided using the token. In this manner, instead of the OTP verification system generating the codes itself for verification, the seed may be securely kept from the OTP verification system, thereby reducing the likelihood that the seed may be accessed without authorization and that, as a result, the token 504 can be cloned. In other words, the OTP verification system does not need the seed because it already has hash values of the codes it will need to verify. As a result, a system employing the techniques of the present disclosure is more secure than systems employing many conventional techniques.

FIG. 1 show an illustrative example of an environment in which various embodiments may be practiced. In the environment 100 illustrated in FIG. 1, a user 102 communicates over a network 104 with a passcode verification system 106, which may be implemented as a verification server that receives verification requests, generates responses to the requests and provides responses to the requests. The user may communicate with the passcode verification system 106 by way of one or more customer devices and/or interfaces such as those described below. The network 104 may be any suitable communications network such as the Internet or another network discussed below or combination of networks. It should be noted that while the user 102 is shown as communicating directly with the passcode verification system 106, communication with the passcode verification system 106 may be indirect. For instance, the passcode verification system 106 may be a backend system of another system with which the user 102 communicates. Further, while FIG. 1 shows communication with the passcode verification system 106 by way of a network 104, communication with the passcode verification system 106 may occur without a network 104. For instance, the user 102 may communicate with the passcode verification system 106 via a local interface (e.g., one or more user input devices) of a system on which the passcode verification system 106 is implemented.

The user 102 may communicate with the passcode verification system 106 for any purpose involving the use of passcodes. A passcode may be information usable to access one or more resources. An example passcode is a password which comprises a string of one or more alphanumeric characters which may be chosen by a user, perhaps in accordance with one or more rules regarding length, complexity and the like. Another example passcode is a PIN. While passwords and PINs are used extensively throughout the present disclosure for the purpose of illustration, the term passcode is intended to be interpreted broadly to cover other types of information usable to access a resource which may or may not be information that a user may know. Example information includes biometric information, demographic information and/or, generally, any information which may correspond to a user, possibly uniquely. Example uses for passcodes include, but are not limited to, access control to data, causing the performance of one or more operations and/or generally access to any resource including physical resources, such as money, in embodiments where the passcode verification system 106 is part of a money dispensing system such as an ATM.

As illustrated in FIG. 1, in an embodiment the passcode verification system utilizes a hardware secret 108. A hardware secret may be secret information maintained by a device such that there is no legitimate way to access the hardware secret. For example, the hardware secret may be encoded in hardware of a hardware device that employs various security measures. The hardware device for example may be tamper resistant, tamper evident and/or generally may employ mechanisms that prevent physical intrusion into the device to obtain the hardware secret. In other words, the hardware secret may be maintained such, so as to be obtainable without physical intrusion into a device that has access to the hardware secret, if such physical intrusion is even possible. Further the hardware secret may be maintained such that there is no request mechanism (e.g., application programming interface (API) for causing hardware, storing the hardware secret, to reveal the hardware secret. As an example, a device storing the hardware secret (e.g., cryptographic module) may be configured to lack an ability to provide a copy of some or all of its memory such that the copy includes the hardware secret. It should be noted however, that while hardware secrets, for which there is no legitimate way of obtaining the hardware secret, are used throughout the disclosure for the purpose of illustration, some hardware secrets may be maintained, such that the hardware secret is obtainable through a limited number of authorized uses, which may require various security protocols to be employed and able to prevent unauthorized access to the hardware secret. Generally, a hardware secret is information for which extraordinary measures must be taken to obtain the hardware secret, if it is possible at all to obtain the hardware secret.

As illustrated in FIG. 1, the environment 100 includes a passcode database 110 or, generally, persistent data storage for information based at least in part on passcodes. The passcode database 110 may be a data storage system with which the passcode verification system 106 communicates for the purpose of storing hash values of passcodes. The passcode database 110, for example, may store hash values of passcodes for multiple users 102 in association with identifiers for the users, thereby allowing for passcodes submitted by users to be verified. The passcode database 110 may be implemented in various ways. For example, the passcode database 110 and passcode verification system 106 may be different computer systems that communicate with one another over a network. In other embodiments, the passcode database 110 is a local storage devise of passcode verification system 106. Numerous variations are also considered as being within the scope of the present disclosure, such as variations where the passcode verification system 106 includes both a separate passcode database and a local cache of passcode hashes.

As illustrated in FIG. 1, hashes in the passcode database are generated, based at least in part, on a passcode and the hardware secret 108. The passcode verification system 106 may, for example, upon receipt of a new passcode from a user 102 or generation of a new passcode for the user 102, calculate a hash of the passcode, based at least in part, on the passcode and the hardware secret. The hash of the passcode may be computed in various ways in accordance with various embodiments. Generally, the hash of the passcode may be calculated, based at least in part, on output of one or more one-way functions. Example one-way functions include, but are not limited to secure hash functions, such as MD5, as those classified as secure hash algorithm two (SHA-2) such as SHA-224, SHA-256, SHA-384 and SHA 512. For example, the hash of the passcodes may be or otherwise may be based at least in part on a keyed-hashed message authentication code (HMAC) such as HMAC_MD5, HMAC-SHA-2 (where HMAC-SHA-2 denotes HMAC using a SHA-2 function). Other example password hashes include password based key derivation functions (PBKDFs) such as PBKDF2 and Bcrypt. It should be noted that the term "one-way" is used in the practical sense and is not necessarily limited to functions within the strict mathematical definition of one way functions. Generally, as used herein, one-way functions are functions satisfying one or more conditions on invertability. For example, the one or more conditions may be that the probability of a random input, generating a given output, is within some bound specified as acceptable or, generally, is believed to be (e.g., as a result of experimentation) within some bound specified as acceptable. In some instances, a function may be considered one-way if there is no known formula or algorithm or for the calculating the inverse.

Other functions and values, based at least in part on the output of the functions, are considered as being within the scope of the present disclosure. Generally, a hash of a passcode is intended to cover the output of any function that takes as input at least a passcode and another value (e.g., hardware secret) and provides output that is a transformation of the passcode to another value. Further, the function may be configured to have an effect on the number of computations required to calculate the function. For example, in some instances the function is configured as a composite function, where computation of the function requires the output of one function to be used as the input to another function, possibly iteratively. The number of iterations of a sub-process involved in calculating the value of a function may be a tunable parameter. In this manner, the amount of computational resources may be configured to avoid the speed at which brute force and other attacks are able to verify password guesses.

The passcode verification system 106 may provide the passcode or information based thereupon to a cryptographic module of the passcode verification system 106 that stores the hardware secret 108. The cryptographic module may be a system configured to securely store and perform operations using one or more hardware secrets. The cryptographic module may be a locally attached device of a computing device, used to implement the verification system 106, or a redundant node thereof or may be a device accessible to the verification system 106 over a network. When implemented as a hardware device, either locally attached or remotely accessible, the cryptographic module may also be referred to as a cryptographic hardware module. Example cryptographic modules are discussed in more detail below. Upon receipt of the password or information based at least in part thereon, the cryptographic module may calculate the hash based at least in part on the hardware secret and information provided from the passcode verification system. The cryptographic module may provide the calculated hash to the passcode verification system, which may then transmit the hash to the passcode database for persistent storage.

As discussed in more detail below, when the user 102 provides a passcode, such as to authenticate or otherwise access one or more services, the user may provide the passcode to the passcode verification system over the network 104. Various secure protocols, such as transport layer security (TSL) and/or socket layer security (SSL), may be used to transfer the passcode from the user 102 to the passcode verification system 106 to avoid sending the passcode over the network 104 in cleartext (plaintext) form. Further, while the user providing a passcode is used throughout for the purpose of illustration, the scope of the present disclosure is intended to cover additional embodiments where the information the user provides for authentication (authentication information) is the passcode or is otherwise based at least in part on the passcode. Example embodiments include those where a passcode input by a user, is transformed before providing to a verification system and, similarly, before the verification system generates a hash for persistent storage. Further, human operator users are depicted in the drawings for illustration, passcodes may be provided by automated systems whether or not the passcodes were provided concurrently by the users themselves.

The passcode verification system 106 may receive the passcode from the user 102, decrypt if necessary, and provide the passcode to a module having the hardware secret to cause the cryptographic module to calculate a hash of the passcode using the hardware secret 108. A result provided from the cryptographic module may be compared by the passcode verification system 106 with a stored hash 112 of the passcode in the passcode database 110. If the calculated hash value and the stored hash value match, it may be considered that the user has successfully validated the passcode (e.g., provided a correct passcode). One or more actions corresponding to successful validation may be performed, such as by providing access to one or more resources.

Figure 2:
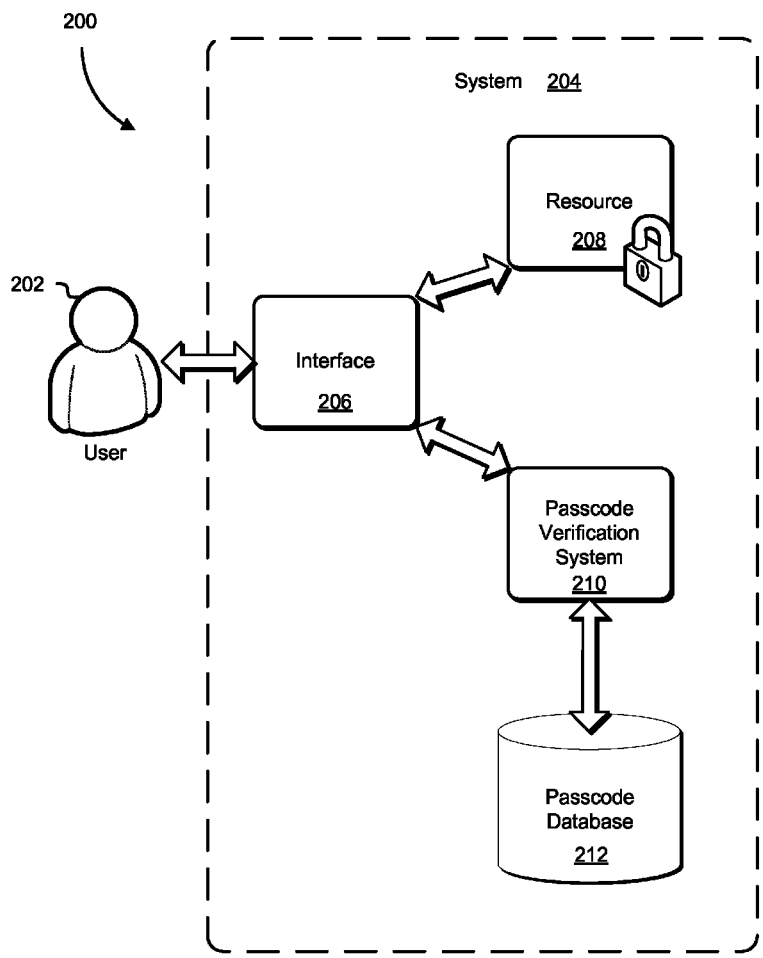
FIG. 2 shows an illustrative example of an environment in which various embodiments can be implemented.

FIG. 2 shows an illustrative example of an environment 200 in which various embodiments may be practiced. In the environment 200, a user 202 communicates with the system 204. The system 204 and, therefore, how the user 202 communicates with the system 204 may vary in accordance with various embodiments. For example, the system 204 may provide access to information through a website and, as a result, communication may include various ways of website navigation. As another example, the system 204 may be an ATM and, as a result, communication may include interaction with a local physical interface (e.g., keypad, touchscreen, cardreader and/or near-screen buttons) of the ATM. As yet another example, the system 204 may be a computing device usable to control access to certain premises, such as through an automated mechanical gate or door. Generally, the system may be any suitable system for which passcodes are used for one more purposes, such as granting access to something for which access is obtainable (e.g., required) by providing a correct passcode.

As noted, in an embodiment, the system 204 includes an interface 206 and the interface 206 may vary as the system 204 varies in accordance with the various embodiments. In some examples, the interface 206 is a web interface and the user 202 communicates with the interface 206 over a network, such as the internet. Communication with the web interface may occur, for example, via a web browser or other application. In some embodiments, the user 202 interacts with the system 204 while in geographic proximity with the system 204. For example, the system 204 may be an ATM and the interface 206 may be a combination of input devices (e.g., keypad, near-screen buttons, touchscreen, card reader and the like) and/or display devices that enable the user 202 to provide input to the system 204. Similarly, the system 204 may be a mobile device, such as a tablet computing device and/or cellular telephone (smart phone) having a touchscreen, keyboard and/or other input device usable by the user 202 for providing input. Generally, the interface 206 may be any collection of computing resources which may include input devices, display devices and/or generally devices that are able to receive remotely and/or locally generated data into the system 204 for processing.

In an embodiment, the interface 206 enables communication with various components with system 204 to provide the user 202 access to a resource 208. The resource 208 may be any resource by which correct presentation of a passcode is a prerequisite for access. Examples, as noted above, include money, data, physical items, services, real property and other resources. Other examples include functions on a computing device (e.g., mobile device, tablet device or personal computer). For instance, a user may use an interface to enter a passcode to unlock a mobile device to access applications of the device, operating system functions and the like. Until a passcode is entered, the device may offer a more limited functionality. Of course, the various embodiments of the present disclosure are not limited to the specific resources explicitly described herein but extend to other types of resources as well.

As noted above, the user 202 interacts with the interface 206 for the purpose of accessing the resource 208. As illustrated by the lock symbol on the resource 208, the resource 208 may be protected by the system from unauthorized access through one or more access control mechanisms. In order to do this, the interface 206 may be configured to require that the user 202 provide a passcode. The interface 206 may receive the passcode from the user 202 and provide the passcode to a passcode verification system 210. The passcode verification system 210 may be a component of the system 204, such as described above in connection with FIG. 1. The passcode verification system, for example, may be implemented as a separate computing device, a programming module on a computing device, a hardware module on a computing device and/or on other ways. The passcode verification system 210, may have access to a passcode database 212, which may store hashes of passcodes. As discussed above in connection with FIG. 1, the passcodes may be generated based, at least in part, on a hardware secret, where the hardware secret may be maintained by the passcode verification system 210 or by another entity with which the passcode verification system 210 is able to communicate.

As noted above, when the user 202 presents a passcode through the interface 206, the passcode verification system 210 may generate, or cause to have generated, a hash of the passcode based at least in part on the passcode and a hardware secret and then compare the generated hash with a hash stored in the passcode database 212. If the generated hash and the stored hash match, the user 202 may be provided access to the resource 208. If, however, the generated hash and the stored hash do not match, the user may be denied access to the resource 208, at least until the user is able to provide a correct passcode or otherwise authenticate.

Figure 3:
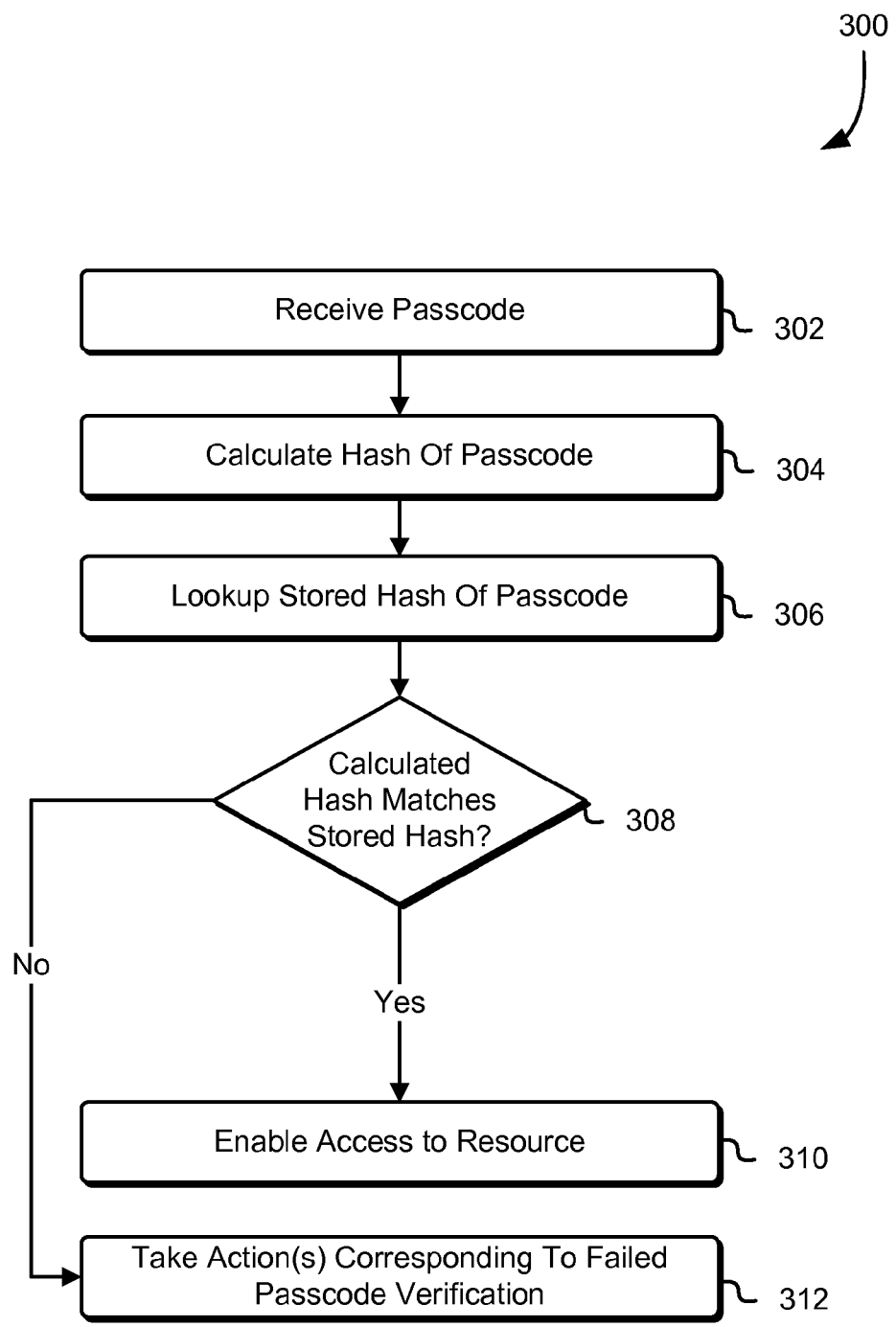
FIG. 3 shows an illustrative example of a process for controlling access to a resource in accordance with at least one embodiment.

FIG. 3 shows an illustrative example of a process 300 which may be used to verify a passcode received from a user, such as described above. The process 300 may be performed by any suitable system or component thereof, such as by a passcode verification system described above. In an embodiment, the process 300 includes receiving 302 a passcode. The passcode may be received in various ways in accordance with various embodiments. As another example, the passcode may be received as a result of a user having input the passcode one or more input devices of a system with which the user interacts. As another example, the passcode may be received over a network, perhaps through one or more components, such as a webserver and/or application server, such as described below. Generally, the passcode may be received 302 in any manner.

In an embodiment, the process 300 includes calculating 304 a hash of the passcode. Calculating the hash of the passcode may be performed by inputting the passcode and a hardware secret and, in some embodiments, other information, such as a salt into a hash or other function, such as described above. Generally, the hash of the passcode may be calculated in any way. Further, while various embodiments of the present disclosure use hashes and hash function for the purpose of illustration, other functions not necessarily commonly categorized as hash functions may be used. For example, as noted, generally any type of one-way function may be used to generate a value based, at least in part, on the passcode and a hardware secret.

In an embodiment, the process 300 includes looking up 306 a stored hash of the passcode. The stored hash of the passcode may be stored in memory of a computer system, such as in volatile or nonvolatile memory of a data storage device locally attached to the system performing the process 300 or remotely accessible to the system performing the process 300. Looking up 306 the stored hash may also include querying a local or remote database. It should be noted that while FIG. 3 illustrates calculating the hash of the passcode and looking the stored hash in a particular order, as other operations described herein, various embodiments of the present disclosure are not necessarily limited to the order in which the operations are illustrated. For example, in some embodiments the stored hash may be looked up before the hash of the passcode is calculated or the look up and the calculation may be performed in parallel. Generally, the order of operations discussed herein are not necessarily performed in the order illustrated unless explicitly stated otherwise or otherwise clear from context. Further, while particular operations on specific data (e.g., passcodes, hardware secrets, salts and the like) are used for the purpose of illustration, such operations may more generally be based in part on such data. The performance of additional operations not described explicitly herein is also considered as being within the scope of the present disclosure.

In an embodiment, the process 300 includes determining 308 whether the calculated hash matches the stored hash. For example, by determining whether the calculated hash and stored hash are equal or otherwise match. If it is determined 308 that the calculated hash matches the stored hash, the process 300 may include enabling 310 access to a resource. As noted above, the resource may vary widely in accordance with various embodiments and enabling access may accordingly vary. For example, enabling access may include the transmission of one or more signals (e.g., messages) that indicate to another component of a system (e.g., server, operating system, automated mechanical device (e.g., lock), application and/or other possible components) to allow access. As an example, enabling access to the resource may include transmitting one or more signals that enables an application on an ATM to allow a user to obtain money from the ATM when the process 300 is performed as part of an access control mechanism for money stored in the ATM. As yet another example, enabling access to the resource may include transmitting one or more signals that, when received by an operating system process of a device, cause the operating system to provide additional functionality. Other examples are also considered as being within the scope of the present disclosure.

Referring back to FIG. 3, if it is determined 308 that the calculated hash does not match the stored hash, the process 300 may include taking 312 one or more actions corresponding to failed passcode verification. The one or more actions may include, for example, transmitting one or more signals causing access to the resource to be denied or simply not transmitting signals that, if transmitted, would enable access. Other operations, such as providing a message indicating that the passcode is incorrect may also be performed. In addition, various embodiments of the present disclosure may be used in conjunction with other access control mechanisms and the one or more actions corresponding to the failed passcode verification may also involve other access control mechanisms. For instance, in some embodiments a limited number of failed passcode attempts are allowed before an adverse event occurs. The adverse event may include, for example, a lockout (e.g., inability to try another passcode) for a predetermined amount of time, destruction of data (e.g. by erasing), and/or generally some type of adverse consequence which either renders the resource inaccessible, temporarily or permanently, or which makes the resource more difficult to access by the user, such as by requirements for additional authentication operations. In some embodiments, accordingly, the one or more actions corresponding to a failed passcode verification may include, for instance, updating a counter of failed passcode attempts. If the counter has already reached a threshold, the one or more actions may include causing one or more adverse events to occur. Other actions considered as being within the scope of disclosure include, but are not limited to, recording a failed passcode attempt, providing notification of a failed passcode attempt, causing a delay before another passcode attempt is permitted and/or other actions.

While FIG. 3 shows an illustrative example of a process for verifying a passcode, other processes are considered as being within the scope of the present disclosure. For example, processes in accordance with the secure remote passcode protocol (SRP) and variations thereof are considered as being within the scope of the present disclosure. Generally, various techniques described herein may be adapted to various ways of performing passcode verification.

Figure 4:
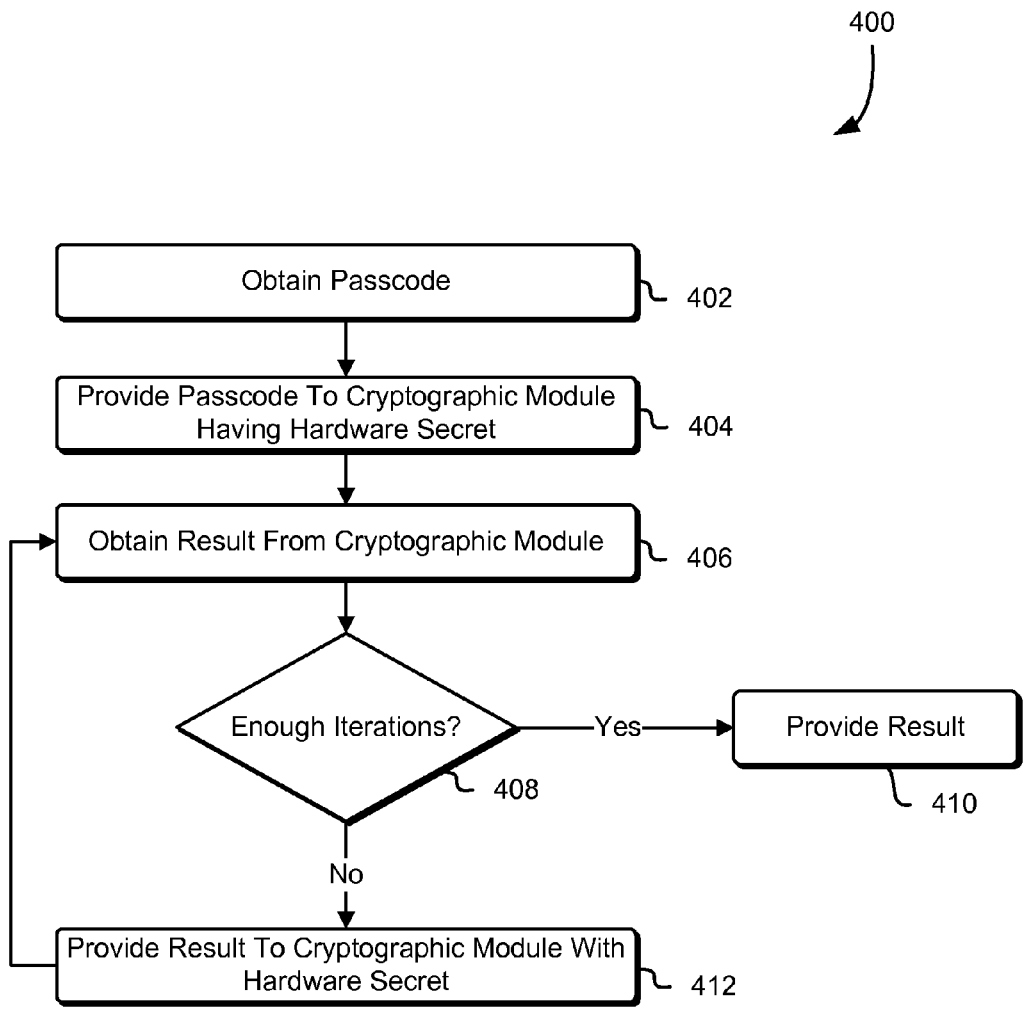
FIG. 4 shows an illustrative example of a process for generating a hash from a passcode in accordance with at least one embodiment.

FIG. 4 shows an illustrative example of a process 400 which may be performed in order to generate a passcode hash in accordance with an embodiment. The process 400 may be performed by any suitable system or component therein. For example, the process 400 may be performed by password verifier having access to a local or remote cryptographic module having a hardware secret, such as described above. The process 400 may be performed in various contexts. For example, the process 400 may be performed to populate a passcode database when a new passcode is received from, generated for or otherwise obtained for a user. The process 400 may also be performed in order to verify a passcode provided by a user. In an embodiment, the process 400 includes obtaining 402 a passcode. The passcode may be obtained 402 in various ways in accordance with various embodiments. For example, the passcode may be obtained through internal communications within a computing device that has received or otherwise obtained the passcode. As another example, when the passcode may be obtained 402 over a network. Generally, the passcode may be obtained in various ways in accordance with various embodiments and, in general, the various contexts in which the process 400 is performed.

In an embodiment, the process includes providing 404 the obtained passcode to a cryptographic module having a hardware secret where the hardware secret may be described as above. Providing 404 the obtained passcode may be performed in various ways depending on the relationship between the cryptographic module and the system performing the process 400. For example, if the cryptographic module is an internal hardware module of the system performing the process 400, providing 404 the passcode may be performed by making a local device-level call to the cryptographic module. As another example, if the cryptographic module is remotely accessible over a network to the system performing the process 400, appropriately formatted network communications may be used to provide the passcode to the cryptographic module. In some embodiments, the cryptographic module is operated by a cryptography service with a web service interface and providing 404 the passcode may be performed via an appropriately configured web service API call. Other variations are also considered as being within the scope of the present disclosure.

A result may be obtained 406 from the cryptographic module. The result may be one or more values generated by the cryptographic module based, at least in part, on the information provided to the cryptographic module and the hardware secret. A determination may be made 408 whether there are enough iterations (i.e., if enough iterations of an iteratively performed calculation involving the passcode and hardware secret have been performed). For example, the cryptographic module may be configured to input information (e.g., passcode or results from a previous result received from the cryptographic module) from the system performing the process 400 into a function (which may itself be iterative within the cryptographic module), such as described above. For a performance of the process 400, each time the system performing the process 400 provides information involving the obtained 402 passcode to the cryptographic module for input with the hardware secret into the function may be considered an iteration for the purpose of the process 400, although other definitions of iteration may be used. Whether enough iterations have been performed may be determined 408 by comparing a count of iterations against a preprogrammed parameter corresponding to a number of iterations. The parameter may, in some embodiments, be configurable, e.g., by a human operator having administrative or other access sufficient for setting the parameter. The number of iterations to be performed may be set based at least in part on physical capabilities of the cryptographic module and/or the system performing the process 400. For example, higher numbers may be set to cause the time to verify a password to exceed a specified minimum time, thereby impeding the speed at which unauthorized attempts at password verification are able to be performed.

If it is determined 408 that a sufficient number of iterations have been performed, the result from the cryptographic module or information based at least upon the result from the cryptographic module may be provided 410. The manner in which the result is provided may vary in accordance with the various contexts in which the process is performed. For instance, providing 410 the result may involve internal device communications encoding the result, network communications encoding the result and/or other operations.

If, however, it is determined 408 that an insufficient number of iterations have been performed then a result from the cryptographic module may be provided 412 to the cryptographic module with the hardware secret. As noted, the result may be used by the cryptographic module as input into a one-way function in order to iterate the process and generate another value. This process of providing the cryptographic module a result obtained from the cryptographic module (or information based at least upon a result received from the cryptographic module) may be repeated until it is determined 408 that a sufficient number of iterations have been performed. Once determined 408 that there are enough iterations as noted above the result may be provided, such as described above.

In this manner, calculating a hash of a passcode may require numerous calls to a module with a hardware secret and generally may require numerous operations thereby making the calculation relatively slow. In this manner, unauthorized attempts to guess the passcode may require computer resource usage which, in the context of normal passcode verification operations, such as when a user supplies a passcode to obtain access to a system, is insignificant, but for which cryptographic attacks which involve multiple guesses of the passcode is significant.

It should be noted that variations of the process 400 are considered as being within the scope of the present disclosure. For example, the process 400 as illustrated is configured to require multiple calls to a cryptographic module in order to ultimately determine the hash of a passcode based at least in part on the passcode and a hardware secret. Other variations include those where the passcode is provided to the cryptographic module and the cryptographic module performs a specified number of iterations before providing a result back. Other variations including those where the cryptographic module performs several iterations to provide a result which is then provided back to the cryptographic module for more iterations are considered as being within the scope of the present disclosure. In addition, while FIG. 4 illustrates certain operations, as with all processes described herein, additional operations may also be performed. For instance, as noted, a result from a cryptographic module may be transformed (e.g., through a one-way function) before being provided back to the cryptographic module. Generally, the particular algorithm illustrated in FIG. 4 is illustrative in nature and a large number of variations that employ the same principles are considered as being within the scope of the present disclosure.

Figure 5:
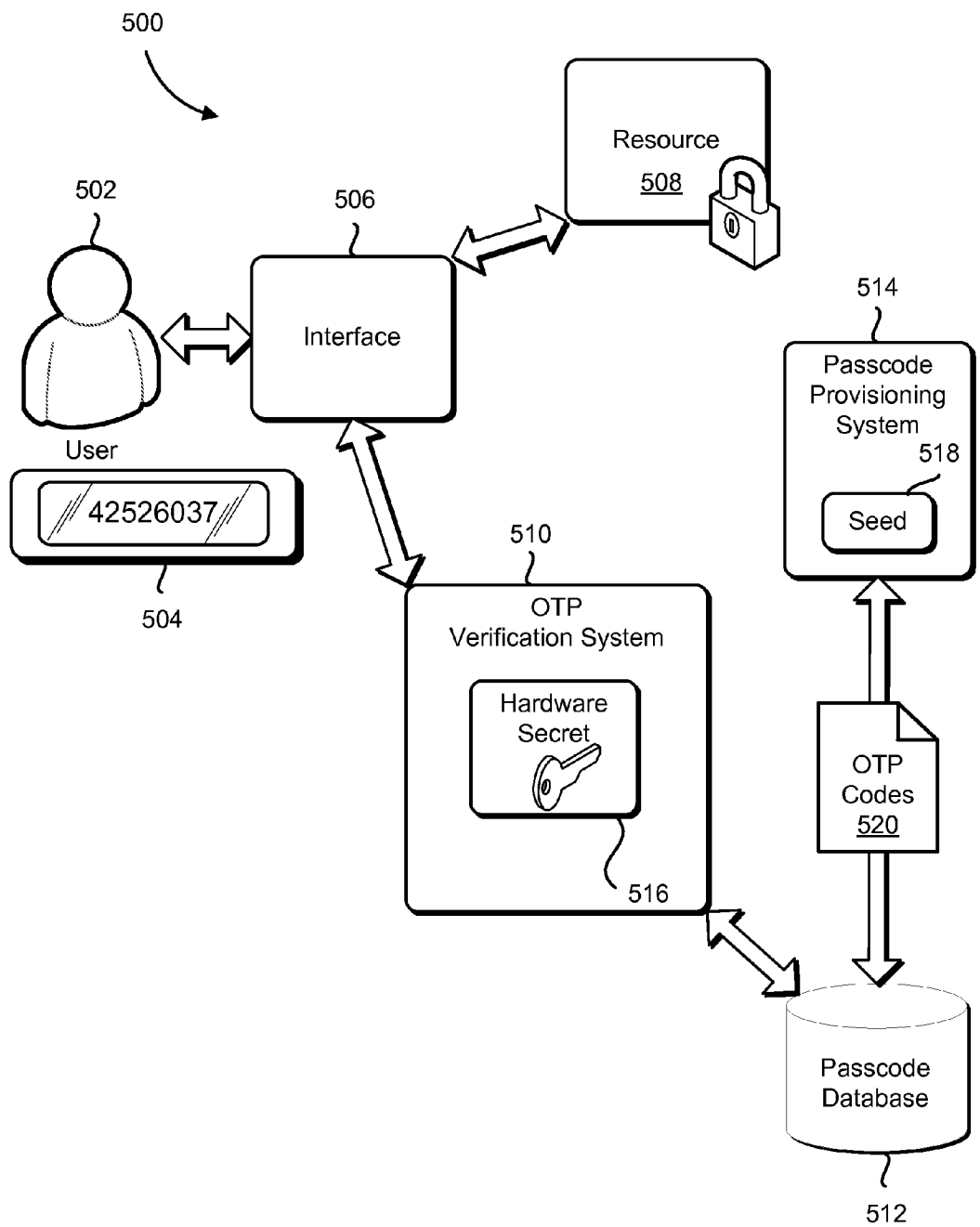
FIG. 5 shows an illustrative example of an environment in which various embodiments can be implemented.

Various embodiments of the present disclosure may also be used in connection within one time passcode/passcode (OTP) verifications systems. FIG. 5 accordingly shows an illustrative example of an environment 500 in which various embodiments may be practiced. As illustrated in FIG. 5, a user 502 may interact with an interface 506 in order to access a resource 508, such as described above. As part of the interaction with the interface 506 the user 502 may provide a one-time passcode which may be a passcode that is valid for only one session transaction period of time or otherwise. The user may have access to a security token 504, that may be a hardware device (hard token) or programming module (soft token) on a computer system configured to generate at various time intervals a new one-time passcode based, at least in part, on a seed which may be, for example, a random value input into a one-time passcode generation algorithm. SecurID tokens produced by RSA Security LLC are illustrative examples of such tokens, although embodiments of the present disclosure are not limited to such tokens.

The user 502 may obtain a one-time passcode provided to the interface 506 for access to the resource 508. In order to control access to the resource 508 interface, it may communicate with a one-time passcode (OTP) verification system 510, which may operate to verify a passcode, such as described above. In particular a passcode provided by the user 503 through the interface 506 may be provided to the OTP verification system 510. The OTP verification system 510 may then obtain a hash of the received passcode and compare the calculated hash with a stored hash of the passcode to determine whether or not the passcode is valid. As illustrated, in some embodiments, the OTP verification system 510 has access to a passcode database 512, which stores a set of passcode hashes, such as described above, that correspond to passcodes that have been and/or will be generated by the security token of the user 502.

For example, the security token may generate one-time passcodes in accordance with a deterministic algorithm. Information stored in the passcode database 512 may include a hash of every passcode that will be generated by the security token over a period of time. For the user 502 for example, the passcode database 512 may store a hash of specified number of passcodes that will be generated by the security token upon the security tokens initialization. As another example the passcode database 512 may store a hash of each passcode that the security token will generate over a specified amount of time such as a month, a year, several years, a predetermined life of the token 504 or the like.

In order to store hashes of multiple passcodes that will be generated by a security token of the user 502 the passcode database 512 may receive the passcodes from a passcode provisioning system 514. The passcode provisioning system may be a system (e.g., computing device or programming module operating on a computing device) that is configured to deterministically generate the codes that the token 504 will generate over a time period. For example, the passcode provisioning system may have access to a seed 518, shared by the token 504, that is used by the token 504 in generating passcodes and may use the seed 518 to generate a set of passcodes that will be generated by the token 504 over time. In an embodiment, the passcode provisioning system 514 generates the codes and provides the generated codes 520 (e.g., over a network or via a physical provisioning device such as a universal serial bus (USB) dongle) to the OTP verification system 510. The OTP verification may receive the passcodes, use a hardware secret 516, such as described above, to generate hash values of the passcodes, and store the passcodes. The plaintext passcodes may then be deleted. In this manner, as described in more detail below, the OTP verification system is able to verify passcodes without the seed used by the token 504, thereby reducing the chance that unauthorized access to the seed will occur, thereby causing a security breach.

The passcodes may be encoded in various data structures, such as lists, Bloom filters, tables that associate codes with timestamps and/or otherwise. In some embodiments, the passcode provisioning system provides the passcodes in the data structure and the OTP verification system modifies the values in the data structure using the hardware secret (e.g., by calculating the hash values of the OTP codes in the provided data structure). In other embodiments, the passcode provisioning system provides the passcodes (e.g., in a list or table) and the OTP verification system generates the data structure that it will use to verify passcodes. Other variations are considered as being within the scope of the present disclosure. For example, the OTP verification system 510 and passcode provisioning system 514 may share the same hardware secret, thereby enabling the passcode provisioning system 514 to provide the passcode hashes to the OTP verification system without requiring the OTP verification system to calculate the hashes itself for populating the passcode database 512.

The OTP verification system may utilize whatever data structure the passcodes are encoded in to determine whether a passcode is valid. For example, upon receipt of a passcode from the user 502 (e.g., pursuant to user-input of the user or input from the token 504 itself), the OTP verification system may use it's hardware secret 516 to calculate a hash of the received passcode and check whether the calculated hash matches a stored hash in the passcode database 512, such as described above.

Because the passcode database 512 may store multiple passcode hashes for a single identity (e.g., the user 502, which may be one of many users for whom sets of passcodes are stored in the passcode database 512), the way in which passcodes are verified may vary among the various embodiments. For example, in some embodiments, a bloom filter may be used to make a determination whether a passcode is correct by using a calculated hash of a received passcode to determine whether the calculated hash appears in the passcode database 512. As another example, a table may associate hashes of passcodes with corresponding time intervals, each of which may be marked by a single time stamp. When a passcode is received for verification at a particular time, the OTP verification system may check whether a calculated hash of the received passcode matches that which is stored for a corresponding time interval. As yet another example, passcode hashes for a user stored in the passcode database 512 may be enumerated. When a passcode is received for verification, the OTP verification system 510 may use the hardware secret 516 to calculate a hash of the received passcode and query the passcode database 512 to determine if the calculated hash is in the database 512. If found, in addition to causing one or more operations to be performed corresponding to the passcode being verified, hashes lower in the enumeration may be electronically marked (e.g., stored in association with an indication of invalidity) as invalid, if not electronically marked as such already. In this manner, passcodes that the token 504 would have calculated in the past are no longer usable. Other variations and combinations of techniques are considered as being within the scope of the present disclosure.

Figure 6:
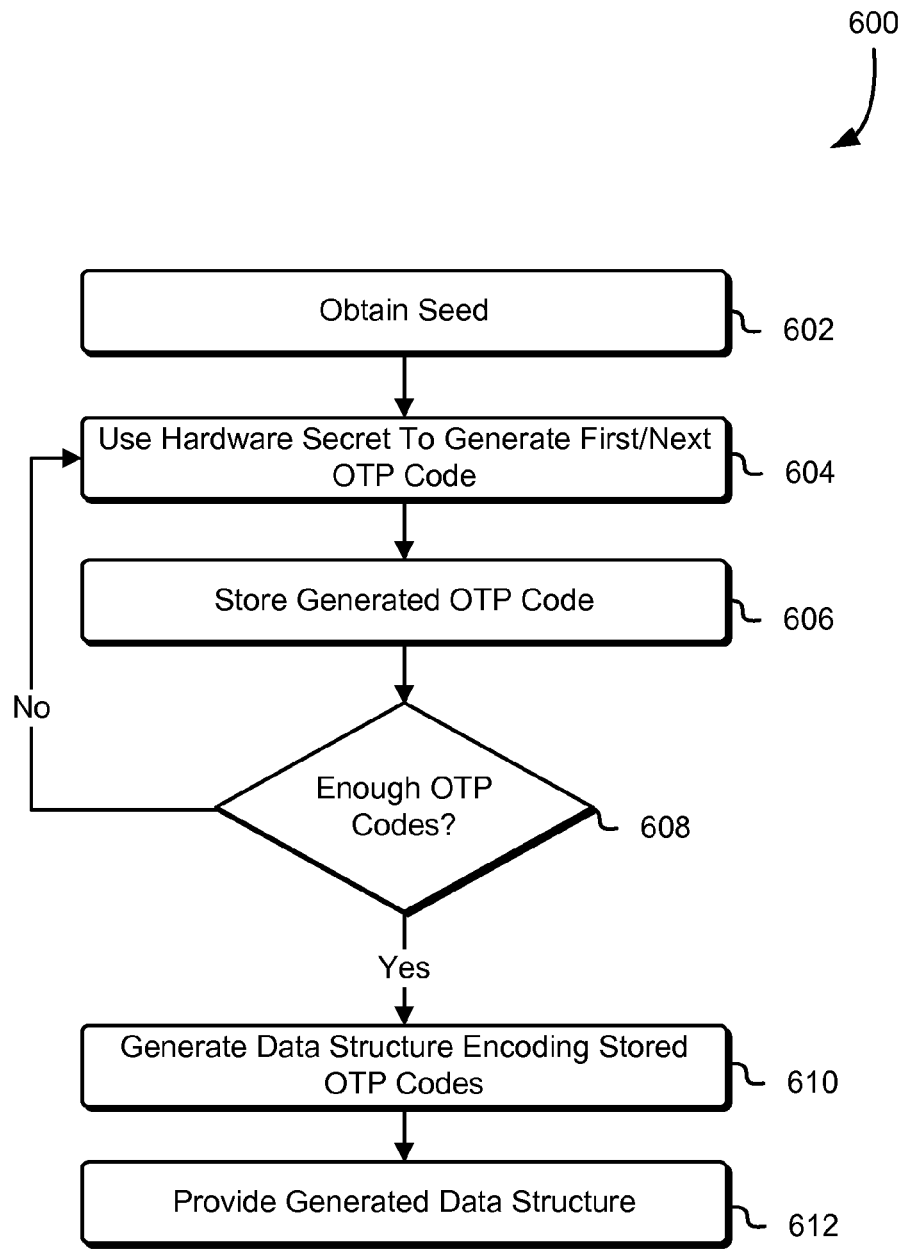
FIG. 6 shows an illustrative example of a process for populating a set of one-time passcodes in accordance with at least one embodiment.

FIG. 6 shows an illustrative example of a process 600 for provisioning a passcode database with hashes of passcodes that will be generated by a security token in accordance with various embodiments. The process 600 may be performed by any suitable system, such as by a passcode provisioning system 514 described above in connection with FIG. 5 or a suitable component thereof. In the embodiment, the process 600 includes obtaining 602 a seed. The seed may be obtained in any suitable manner. For example, the seed may be obtained as output of a random number generator. Generally, the seed may be obtained in any suitable way and the seed may match a seed provided to a token, such as the token 504 discussed above in connection with FIG. 5.

A hardware secret may then be used 604 to generate a first OTP code. Generating an OTP code may be performed in various ways in accordance with various embodiments. For example, the hardware secret, the seed and a time may be input into a function (e.g., hash function) whose algorithm for calculation, which may be iterative, is programmed into the system performing the process 600. Once the hardware secret has been used to generate the first OTP code, the generated first OTP code may be stored 606. For example, the generated OTP code may be stored in a file, database or otherwise in volatile memory and/or nonvolatile memory.

A determination may be made 608 whether enough OTP codes have been generated, where the number considered enough may be preprogrammed and/or configurable. If determined 608 that an insufficient number of OTP codes have been generated, the process 600 may include using 604 the hardware secret to generate and store 606 the next OTP code. The next OTP code, in some embodiments, is based at least in part on a previously generated OTP code (e.g., the immediately preceding generated OTP code), although in other embodiments, each OTP code may be independently generated. Generation and storage of OTP codes may repeat until it is determined 608 that a sufficient number of OTP codes have been generated. Once determined 608 that a sufficient number of OTP codes have been generated, the process 600 may include generating 610 a data structure encoding the stored OTP codes. The data structure may be configured in various ways in accordance with various embodiments, such as described above. The data structure may be provided 612 to one or more OTP verifications where, if multiple OTP verifications, each OTP verification system may be a member of a redundant fleet, each with a different hardware secret. An OTP verification may reconfigure and use the provided 612 passcodes, such as described above.

Figure 7:
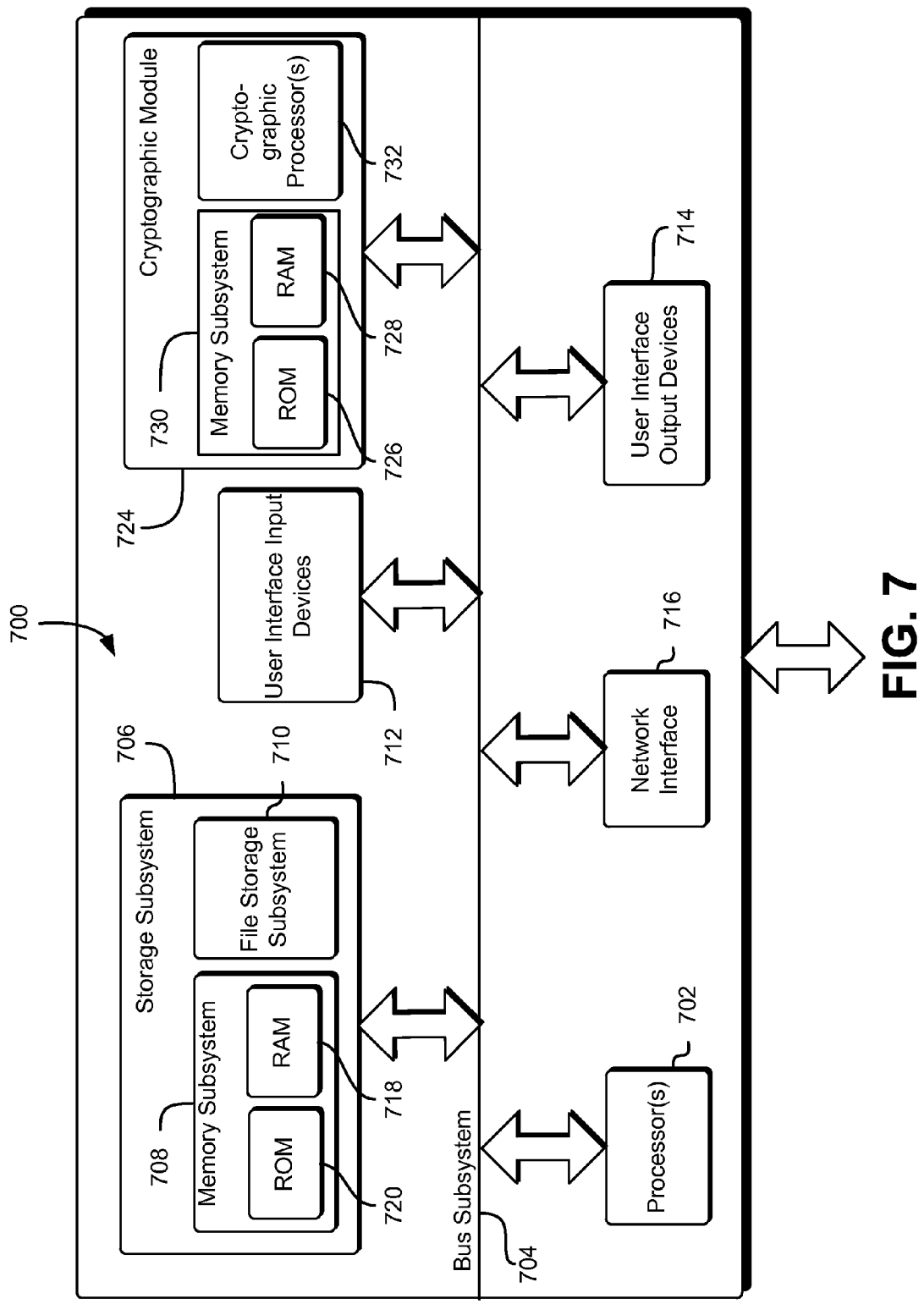
FIG. 7 shows an illustrative example of a device that may be used in accordance with various embodiments.

FIG. 7 is an illustrative, simplified block diagram of an example device system 700 that may be used to practice at least one embodiment of the present disclosure. In various embodiments, the device system 700 may be used to implement any of the systems illustrated herein and described above. For example, the device system 700 may be used to generate data (e.g., passcode hashes) for populating a database and/or to verify passcodes. As shown in FIG. 7, the device 700 may include one or more processors 702 that may be configured to communicate with and are operatively coupled to a number of peripheral subsystems via a bus subsystem 704. These peripheral subsystems may include a storage subsystem 706, comprising a memory subsystem 708 and a file storage subsystem 710, one or more user interface input devices 712, one or more user interface output devices 714, a network interface subsystem 716, a cryptographic module 724, comprising a memory subsystem 730 and one or more cryptographic processors 732.

The bus subsystem 704 may provide a mechanism for enabling the various components and subsystems of device system 700 to communicate with each other as intended. Although the bus subsystem 704 is shown schematically as a single bus, alternative embodiments of the bus subsystem may utilize multiple busses.

The network interface subsystem 716 may provide an interface to other device systems and networks. The network interface subsystem 716 may serve as an interface for receiving data from and transmitting data to other systems from the device system 700. For example, the network interface subsystem 716 may enable receipt of passcodes and provide information indicating whether received passcodes are authentic (e.g., correct). For example, a verification request may be provided to the device 700 and the network interface 716 may enable both the received and a response to be provided. The network interface subsystem 716 may also facilitate the receipt and/or transmission of data on other networks, such as an organizations intranet and/or other networks described below.

The user interface input devices 512 may include one or more buttons, a keyboard, keypad, pointing devices, such as an integrated mouse, trackball, touchpad, or graphics tablet, a scanner, a barcode scanner, a fingerprint scanner, a retinal scanner, a touchscreen incorporated into a display, audio input devices, such as voice recognition systems, microphones and other types of input devices. Further, in some embodiments, input devices may include devices usable to obtain information from other devices. Input devices may include, for instance, magnetic or other card readers, one or more USB interfaces, near field communications devices and other devices usable to obtain data from other devices. In general, use of the term "input device" is intended to include all possible types of devices and mechanisms for inputting information to the device system 700.

User interface output devices 714, if any, may include a display subsystem, a printer or non-visual displays, such as audio output devices, etc. The display subsystem may be a cathode ray tube (CRT), a flat-panel device, such as a liquid crystal display (LCD), light emitting diode (LED) display, or a projection or other display device. In general, use of the term "output device" is intended to include all possible types of devices and mechanisms for outputting information from the device system 700. The output device(s) 714 may be used, for example, to present user interfaces to facilitate user interaction with applications performing processes described herein and variations therein, when such interaction may be appropriate. While a device 700 with user interface output devices is used for the purpose of illustration, it should be noted that the device 700 may operate without an output device, such as when the device 700 is operated in a server rack and, during typical operation, an output device is not needed.

The storage subsystem 706 may provide a computer-readable storage medium for storing the basic programming and data constructs that may provide the functionality of at least one embodiment of the present disclosure. The applications (programs, code modules (i.e., programming modules), instructions) that, when executed by one or more processors, may provide the functionality of one or more embodiments of the present disclosure, may be stored in the storage subsystem 706. These application modules or instructions may be executed by the one or more processors 702. The storage subsystem 706 may additionally provide a repository for storing data used in accordance with the present disclosure. The storage subsystem 706 may comprise a memory subsystem 708 and a file/disk storage subsystem 710.

The cryptographic module 724, which may be a trusted platform module, includes a memory subsystem 730, including a main random access memory (RAM) 728 for storage of instructions and data during program execution and a read only memory (ROM) 726, in which fixed cryptographic information may be stored, such as a hardware secret. The device 700 may also store keys in RAM 728 and/or processor registers for temporary cryptographic processing. The cryptographic information stored in memory may be used in combination with cryptographic information (e.g., passcode and/or information based at least in part thereon) obtained via the network interface 716 and/or one or more of the user interface input devices 712. The one or more cryptographic processors may be used to perform cryptographic operations in the device and may include a random number generator, SHA-2 or other hash generator and an encryption-decryption-signature engine. Generally, one or more components of the cryptographic module 724 may be configured to collectively perform various operations used in calculating hashes of passcodes, such as described above.

As noted above, in various embodiments of the present disclosure, hardware secrets are securely stored within the cryptographic module 724. In some embodiments, the cryptographic module is implemented as or may contain a physically unclonable function (PUF), which is a function implemented in physical hardware to use one or more hardware secrets that are based at least in part on physical characteristics of the PUF. As a result, any attempt to obtain a hardware secret may require physical intrusion into the PUF and physical intrusion may alter the physical characteristics of the PUF, thereby destroying the hardware secret. Example PUFs that may be used include PUFs using explicitly-introduced randomness, optical PUFs, coating PUFs, PUFs using intrinsic randomness, delay PUFs, static random access memory (SRAM) PUFs, butterfly PUFs, bistable ring PUFs, magnetic PUFs, metal resistance PUFs and/or other devices whose physical characteristics encode information usable as or for a hardware secret.

In addition, the cryptographic module 724 may be configured to have certain speed and/or degradation characteristics.

For example, the processing capabilities of the cryptographic module 724 may be configured to be slow relative to other processing capabilities, such as those available in commodity processing devices. In some embodiments, for instance, it may be desirable to limit the speed at which the device 700 is able to calculate hashes since, in authorized uses (e.g., password verification), slow processing (e.g., a delay of milliseconds relative to other processors available) may be insignificant to a typical authorized user who submits a password relatively infrequently (e.g., once per session), but very significant to an unauthorized user, such as someone who has stolen the device 700 and information in a passcode database and is using the device 700 to try to determine passwords from stored hash values.

Degradation characteristics may be used to limit the number of operations that the device 700 is physically able to perform. For instance, writing to certain types of memory (e.g., flash memory) can cause the memory to become unusable over time. The probability that a portion memory will become unusable after a number of write operations may follow a probability distribution which may be determined through experimentation. Accordingly, the device 700 may be configured to perform a specified number of writes to memory for each passcode verification. Calculation of a hash of a passcode may be programmed to require writes to the memory. The specified number may be selected such that, according to the probability distribution, the probability of the memory becoming unusable exceeds some threshold (e.g., 0.99) after a specified number of verifications (e.g., the expected number of verifications to be requested over an expected lifetime of the device 700 or a multiple thereof greater than one). Similarly, the specified number of writes may be configured such that the probability of the device ceasing to function at some desired number of passcode verification remains within an acceptable bound (e.g., 0.01). In this manner, the device 700 can be configured to, as a matter of probability, function properly over some expected number of verifications and/or time period when used in an authorized manner (e.g., passcode verification using authorized channels), yet cease to function when used in an unauthorized manner (e.g., by attempting to determine a passcode from a hash of a passcode, which, probabilistically, will require more verifications than the device 700 is able to perform).

Other variations are also considered as being within the scope of the present disclosure. For example, in the above illustrative examples, stored passcode hashes are generated and verified symmetrically (using the same hardware secret). In some embodiments, however, a persistently stored passcode hash may be generated using one secret and verified using another secret. In some examples, for instance, the hardware secret may be a private key of a public-private key pair for an asymmetric cryptographic algorithm. A hash value may be calculated and persistently stored based at least in part on a public key of the public-private key pair, where the public key is not maintained as a hardware secret. Further while hash values are used throughout for the purpose of illustration, other values that are not necessarily classified as hash values may be used. For example, general output of one-way functions may be used whether or not the functions are classified as hash functions. As another example, output of invertible functions may be used. In some examples, for instance, a hardware secret may be used to generate an encrypted passcode (or encrypted data based at least in part on the passcode). When a passcode is received, the hardware secret may be encrypted to determine whether the encrypted passcode matches a stored encrypted passcode. Alternatively, a stored encrypted passcode may be decrypted using the hardware secret to determine whether the decrypted passcode matches a received passcode.

Figure 8:
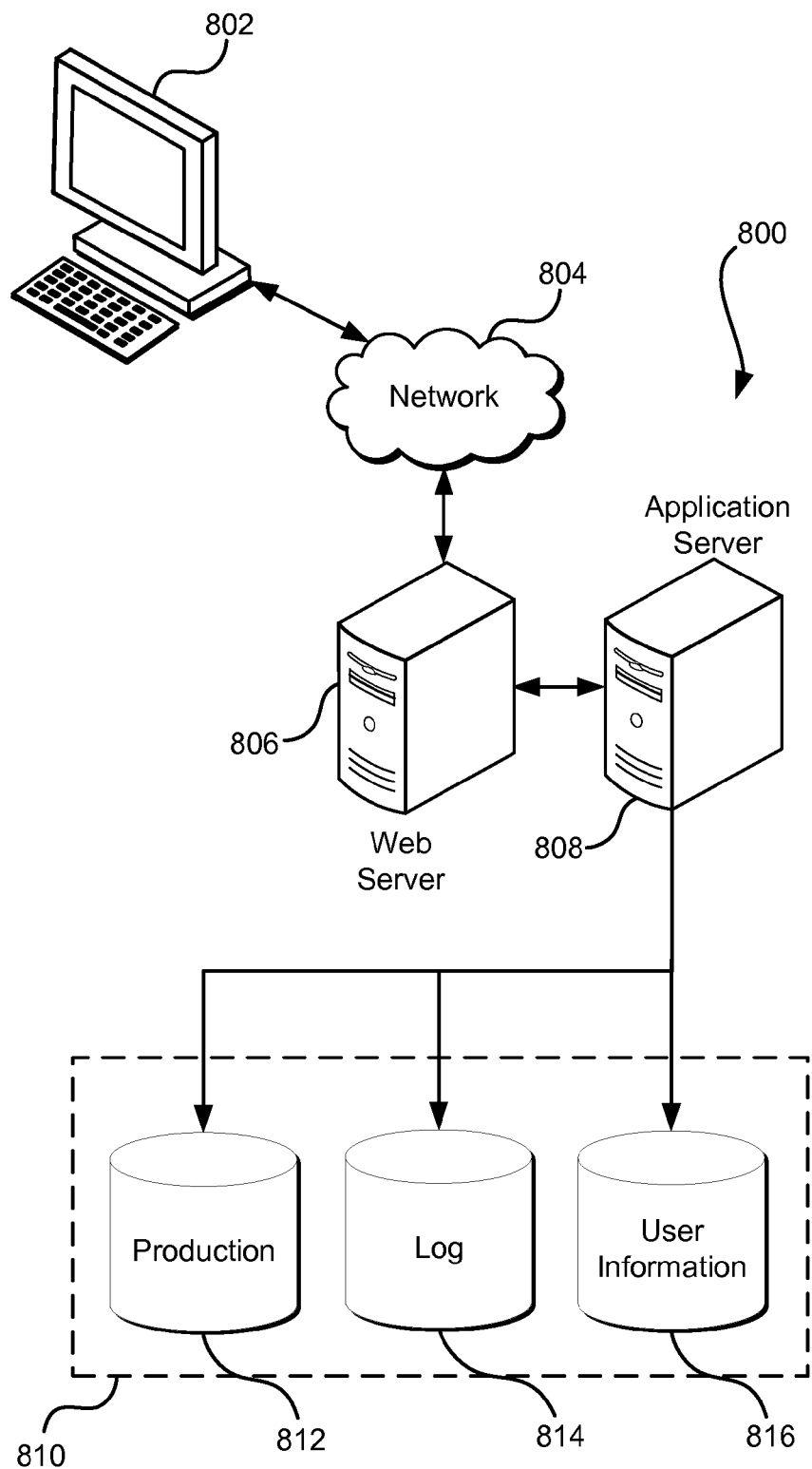
FIG. 8 illustrates an environment in which various embodiments can be implemented.

FIG. 8 illustrates aspects of an example environment 800 for implementing aspects in accordance with various embodiments. As will be appreciated, although a web-based environment is used for purposes of explanation, different environments may be used, as appropriate, to implement various embodiments. The environment includes an electronic client device 802, which can include any appropriate device operable to send and receive requests, messages or information over an appropriate network 804 and convey information back to a user of the device. Examples of such client devices include personal computers, cell phones, handheld messaging devices, laptop computers, tablet computers, set-top boxes, personal data assistants, embedded computer systems, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a web server 806 for receiving requests and serving content in response thereto, although for other networks an alternative device serving a similar purpose could be used as would be apparent to one of ordinary skill in the art.

The illustrative environment includes at least one application server 808 and a data store 810. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device, handling some (even a majority) of the data access and business logic for an application. The application server may provide access control services in cooperation with the data store and is able to generate content such as text, graphics, audio and/or video to be transferred to the user, which may be served to the user by the web server in the form of HyperText Markup Language ("HTML"), Extensible Markup Language ("XML") or another appropriate structured language in this example. The handling of all requests and responses, as well as the delivery of content between the client device 802 and the application server 808, can be handled by the web server. It should be understood that the web and application servers are not required and are merely example components, as structured code discussed herein can be executed on any appropriate device or host machine as discussed elsewhere herein. Further, operations described herein as being performed by a single device may, unless otherwise clear from context, be performed collectively by multiple devices, which may form a distributed system.

The data store 810 can include several separate data tables, databases or other data storage mechanisms and media for storing data relating to a particular aspect of the present disclosure. For example, the data store illustrated may include mechanisms for storing production data 812 and user information 816, which can be used to serve content for the production side. The data store also is shown to include a mechanism for storing log data 814, which can be used for reporting, analysis or other such purposes. It should be understood that there can be many other aspects that may need to be stored in the data store, such as page image information and access rights information, which can be stored in any of the above listed mechanisms as appropriate or in additional mechanisms in the data store 810. The data store 810 is operable, through logic associated therewith, to receive instructions from the application server 808 and obtain, update or otherwise process data in response thereto. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 802. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 8. Thus, the depiction of the system 800 in FIG. 8 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network and any combination thereof.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers and business application servers. The server(s) also may be capable of executing programs or scripts in response to requests from user devices, such as by executing one or more web applications that may be implemented as one or more scripts or programs written in any programming language, such as Java®, C, C# or C++, or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including" and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members used in the above conjunctive phrase, "at least one of A, B, and C" and "at least one of A, B and C" refers to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C to each be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this disclosure are described herein, including the best mode known to the inventors for carrying out the invention. Variations of those preferred embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A computer-implemented method, comprising:
   under the control of one or more computer systems configured with executable instructions,
      receiving a request to verify a passcode for an identity, the passcode required for at least one method of obtaining access to a resource;

calculating a reference value based at least in part on the passcode and a hardware secret, the hardware secret comprising secret information maintained within a hardware device so as to be unobtainable without physical intrusion into the hardware device;

using a probabilistic data structure that contains a plurality of obtained values each verifiable based at least in part on the hardware secret to perform a comparison of the reference value with a stored value obtained from persistent data storage, separate from the hardware device, in which the stored value is stored in association with the identity; and providing a response to the request based at least in part on the comparison, the response being configured to enable access to the resource when the comparison indicates that the calculated reference value matches the stored value.

2. The computer-implemented method of claim 1, wherein calculating the reference value includes iterative use of the hardware secret.

3. The computer-implemented method of claim 1, wherein:
the one or more computer systems includes a computing device;
the hardware secret is maintained within a hardware component of the computing device; and
calculating the reference value includes providing information based at least in part on the passcode to the hardware component.

4. The computer-implemented method of claim 3, wherein the hardware component implements a physically unclonable function used to calculate the reference value.

5. The computer-implemented method of claim 1, wherein:
the passcode is a one-time passcode; and
performing the comparison includes selecting the stored value from a set of pre-generated values corresponding to pre-generated one-time passcodes stored in association with the identity.

6. The computer-implemented method of claim 5, wherein at least a subset of the pre-generated one-time passcodes correspond to codes that a security token corresponding to the identity is configured to generate in the future.

7. The computer-implemented method of claim 6, wherein:
the security token is configured to generate codes based at least in part on a seed value; and
the one or more computer systems lack access to the seed value.

8. A system, comprising at least one computing device configured to implement a verification server configured to:
obtain information based at least in part on a passcode;
cause a reference value to be calculated based at least in part on the obtained information and a hardware secret stored inside of a hardware device; and
provide information indicating whether the calculated reference value matches a persistently stored value by using the persistently stored value to determine matching of the obtained information by using a filter that contains a plurality of obtained values each verifiable based at least in part on the hardware secret to determine whether obtained information matches one of the plurality of obtained values, the stored value persistently stored outside of the hardware device and having been calculated based at least in part on the passcode.

9. The system of claim 8, wherein the verification server is further configured to determine whether the calculated value matches the stored value and the provided information is dependent at least in part on whether the calculated value matches the stored value.

10. The system of claim 8, wherein:
the system further comprises a cryptographic hardware module configured to be unable to output the hardware secret; and
causing the reference value to be calculated includes causing the cryptographic hardware module to perform one or more cryptographic operations based at least in part on the hardware secret and the obtained information.

11. The system of claim 10, wherein:
the cryptographic hardware module implements a physically unclonable function based at least in part on the hardware secret; and
causing the reference value to be calculated is based at least in part on the physically unclonable function.

12. The system of claim 8, wherein the obtained information is the passcode.

13. The system of claim 8, wherein:
the passcode is from a first set of possible passcodes having a first cardinality;
the hardware secret is from a second set of hardware secrets having a second cardinality; and
the first cardinality is smaller than the second cardinality.

14. The system of claim 8, wherein causing the reference value to be calculated includes performing multiple calls to a device configured to perform cryptographic operations using the hardware secret.

15. The system of claim 8, wherein:
the system includes a local user input device; and
obtaining the information includes receiving the passcode through the user input device.

16. The system of claim 8, wherein:
the system further comprises a passcode database storing, for each particular identity of a plurality of identities that include an identity associated with the passcode, a particular value generated based at least in part on a passcode for the particular identity and the hardware secret; and
the verification server is further configured to select the persistently stored value based at least in part on an association in the passcode database between the persistently stored value and the identity.

17. The system of claim 8, wherein the system further comprises a passcode database that, for each particular identity of a plurality of identities, stores multiple particular values each calculated based at least in part on a seed value and the hardware secret and corresponding to a one-time passcode that a security token of a corresponding user is configured to generate in the future.

18. A non-transitory computer-readable storage medium having stored thereon instructions that, when executed by one or more processors of a computer system, cause the computer system to:
obtain information based at least in part on a passcode of an identity;
obtain a value calculated based at least in part on the obtained information and a hardware secret stored within a hardware device;
read a persistently stored value from a data storage device different from the hardware device; and
use the persistently stored value and the obtained value to verify, based at least in part on whether the persistently stored value matches the obtained value, at least one authentication attempt, wherein
the persistently stored value is encoded in an enumerated plurality of obtained values each verifiable based at least in part on the hardware secret; and using the persistently stored value to verify at least one authentication attempt includes, when received authentication information matches a particular value in the enumerated plurality of obtained values, causing one or more obtained values to be electronically marked as invalid based at least in part on the one or more obtained values' position(s) in the enumerated plurality of obtained values relative to the particular value.

19. The non-transitory computer-readable storage medium of claim 18, wherein the persistently stored value comprises is read from a database that associates each value of a plurality of values verifiable at least in part on the hardware secret with a corresponding identity.

20. The non-transitory computer-readable storage medium of claim 18, wherein the computer system lacks a persistently stored copy of the passcode.

21. The non-transitory computer-readable storage medium of claim 18, wherein obtaining the value includes making multiple calls to the hardware device having the hardware secret to cause the hardware device perform one or more cryptographic operations using the hardware secret.

22. The non-transitory computer-readable storage medium of claim 18, wherein the persistently stored value is from a plurality of pre-generated passcodes each verifiable based at least in part on the hardware secret.

23. The non-transitory computer-readable storage medium of claim 18, wherein using the persistently stored value to verify at least one authentication attempt includes using a Bloom filter that contains a plurality of obtained values each verifiable based at least in part on the hardware secret to determine whether received authentication information matches one of the plurality of obtained values.

* * * * *